(12) United States Patent
Nishimura et al.

(10) Patent No.: US 10,253,175 B2
(45) Date of Patent: Apr. 9, 2019

(54) ACRYLIC RESIN FILM HAVING EXCELLENT RESISTANCE TO WHITENING ON BENDING AND EXCELLENT CRACKING RESISTANCE

(71) Applicant: KANEKA CORPORATION, Osaka-shi, Osaka (JP)

(72) Inventors: Kimihide Nishimura, Takasago (JP); Nobuhiro Yamamoto, Takasago (JP)

(73) Assignee: KANEKA CORPORATION, Osaka-shi (JP)

( * ) Notice: Subject to any disclaimer, the term of this patent is extended or adjusted under 35 U.S.C. 154(b) by 708 days.

(21) Appl. No.: 14/349,788

(22) PCT Filed: Oct. 2, 2012

(86) PCT No.: PCT/JP2012/006309
§ 371 (c)(1),
(2) Date: Apr. 4, 2014

(87) PCT Pub. No.: WO2013/051239
PCT Pub. Date: Apr. 11, 2013

(65) Prior Publication Data
US 2014/0308501 A1 Oct. 16, 2014

(30) Foreign Application Priority Data
Oct. 5, 2011 (JP) .................................. 2011-221425

(51) Int. Cl.
| | | |
|---|---|---|
| *C08L 51/04* | (2006.01) | |
| *C08L 33/12* | (2006.01) | |
| *C08J 5/18* | (2006.01) | |
| *C08L 33/10* | (2006.01) | |
| *C08F 265/06* | (2006.01) | |
| *C08F 285/00* | (2006.01) | |
| *C08J 7/04* | (2006.01) | |

(52) U.S. Cl.
CPC ............ *C08L 51/04* (2013.01); *C08F 265/06* (2013.01); *C08F 285/00* (2013.01); *C08J 5/18* (2013.01); *C08J 7/047* (2013.01); *C08L 33/10* (2013.01); *C08J 2333/12* (2013.01); *C08J 2475/16* (2013.01); *C08L 33/12* (2013.01); *Y10T 428/31573* (2015.04); *Y10T 428/31663* (2015.04); *Y10T 428/31855* (2015.04); *Y10T 428/31928* (2015.04)

(58) Field of Classification Search
CPC .......... C08L 51/04; C08L 33/10; C08L 33/12; C08J 7/047; C08J 5/18; C08J 2475/16; C08J 2333/12; C08F 285/00; C08F 265/06; Y10T 428/31855; Y10T 428/31663; Y10T 428/31573
See application file for complete search history.

(56) References Cited

U.S. PATENT DOCUMENTS

| | | | | |
|---|---|---|---|---|
| 4,180,529 A | * | 12/1979 | Hofmann | ............... C08F 285/00 525/80 |
| 4,341,883 A | * | 7/1982 | Gift | ........................ C08F 285/00 525/304 |
| 5,196,480 A | | 3/1993 | Seitz et al. | |
| 2003/0125465 A1 | | 7/2003 | Koyama et al. | |
| 2006/0134400 A1 | * | 6/2006 | Takada | .................. C08G 18/672 428/313.9 |
| 2007/0212561 A1 | | 9/2007 | Wada et al. | |
| 2007/0243364 A1 | * | 10/2007 | Maekawa | ............. C08L 33/064 428/220 |
| 2009/0012215 A1 | * | 1/2009 | Wada | ...................... B32B 27/18 524/91 |
| 2009/0311518 A1 | * | 12/2009 | Valeri | .................. C09D 133/08 428/336 |

FOREIGN PATENT DOCUMENTS

| | | |
|---|---|---|
| EP | 1754752 A1 | 2/2007 |
| GB | 2039496 A | 8/1980 |
| JP | 04-225051 A | 8/1992 |
| JP | 08-323934 A | 12/1996 |
| JP | 9272778 A | 10/1997 |
| JP | 10-279766 A | 10/1998 |
| JP | 10-306192 A | 11/1998 |
| JP | 2002-309059 A | 10/2002 |
| JP | 200325412 A | 1/2003 |
| JP | 2003-183471 A | 7/2003 |
| JP | 2005-200502 A | 7/2005 |
| JP | 2005-344080 A | 12/2005 |
| JP | 2006232879 A | 9/2006 |
| JP | 3835275 B2 | 10/2006 |
| JP | 2009-56770 A | 3/2009 |
| JP | 4291994 B2 | 7/2009 |

(Continued)

OTHER PUBLICATIONS

Extended European Search Report dated Sep. 29, 2015 issued in counterpart International PCT/JP2012006309 (8 pages).

(Continued)

*Primary Examiner* — Nancy R Johnson
(74) *Attorney, Agent, or Firm* — Westerman, Hattori, Daniels & Adrian, LLP

(57) ABSTRACT

Disclosed herein is an acrylic resin film that is less likely to whiten on bending when laminated on a plastic molded body or the like, has well-balanced physical properties such as high surface hardness, excellent transparency, and excellent cracking resistance, and is therefore suitable for use in decorative molding. The acrylic resin film is obtained by forming, into a film, a methacrylic resin composition (D) containing a specific methacrylate-based resin (A), a rubber-containing four-stage graft copolymer (B) containing rubber particles having an average particle size of 0.2 to 0.4 μm, and a rubber-containing two-layer graft copolymer (C) containing rubber particles having an average particle size of 0.02 to 0.15 μm.

11 Claims, No Drawings

(56) References Cited

FOREIGN PATENT DOCUMENTS

| | | |
|---|---|---|
| JP | 2011053548 A | 3/2011 |
| JP | 2011116952 A | 6/2011 |
| TW | 200700486 A | 1/2007 |

OTHER PUBLICATIONS

Taiwanese Office Action dated May 16, 2014, issued in corresponding Taiwanese Patent Application No. 101137015 with partial English translation (7 pages).
International Search Report for PCT/JP2012/006309, dated Dec. 18, 2012.

* cited by examiner

ACRYLIC RESIN FILM HAVING EXCELLENT RESISTANCE TO WHITENING ON BENDING AND EXCELLENT CRACKING RESISTANCE

TECHNICAL FIELD

The present invention relates to an acrylic resin film that offers an excellent balance of cracking resistance, surface hardness, and resistance to whitening on bending.

BACKGROUND ART

Acrylic resin film obtained by processing and molding an acrylic resin composition containing a cross-linked elastomer is used in and developed for various applications for its transparency and hardness. Examples of the application of acrylic resin film include alternatives to painting to be laminated on interior or exterior car parts, exterior materials for mobile phones, personal computers and other home appliances, and floor materials for building. As a method for decorating a plastic surface, there is a film in-mold molding method in which a film, such as an acrylic resin film, previously subjected to or not subjected to vacuum molding or the like is inserted into an injection mold and a base resin is injected into the mold. Various acrylic resin films suitable for such an application have been proposed. For example, a method is known in which the reduced viscosity of a plastic polymer and the particle size and rubber content of a rubber-containing polymer are specified (Patent Document 1), and a method is known in which the reduced viscosity of an acrylic polymer and the amount of a multi-layer acrylic polymer contained are specified (Patent Documents 2 and 3). It is known that films obtained by these methods are excellent in surface hardness, transparency and film moldability.

In these Patent Documents, however, there is no description about the problem of film whitening on bending. These films for use in film in-mold molding each have a problem that when laminated on a molded article having a complicated shape, the film is likely to whiten due to the concentration of stress on the corners or the like of the molded article, which significantly reduces the commercial value of the molded article.

As a method for forming a film having improved resistance to whitening on bending, a method is known in which a relationship between the degree of cross-linking and particle size of a cross-linked elastomer is specified (Patent Document 4). However, a film formed by such a method has a problem that its resistance to whitening on bending is excellent but its balance of physical properties such as resistance to whitening on bending, cracking resistance and surface hardness is not optimized. Further, a method has been proposed in which two kinds of rubbers are blended to obtain an acrylic resin film having excellent solvent resistance and transparency (Patent Document 5). However, in Patent Document 5, there is no description about resistance to whitening on bending, and of course, there is no description about the balance of physical properties such as resistance to whitening on bending, cracking resistance, and surface hardness, either. Further, a method has been proposed in which two kinds of rubbers are blended to obtain an acrylic resin film that can maintain an excellent appearance without white turbidity even when heated during molding (Patent Document 6). However, also in Patent Document 6, there is no description about resistance to whitening on bending. Therefore, an improved balance of physical properties such as resistance to whitening on bending, cracking resistance, and surface hardness has not yet been achieved.

Patent Document 1: JP-A-8-323934
Patent Document 2: JP-A-10-279766
Patent Document 3: JP-A-10-306192
Patent Document 4: Japanese Patent No. 4291994
Patent Document 5: JP-A-2002-309059
Patent Document 6: Japanese Patent No. 3835275

DISCLOSURE OF THE INVENTION

Problems to be Solved by the Invention

An object of the present invention is to provide a film that is less likely to whiten on bending when laminated on a plastic molded body or the like, has well-balanced physical properties such as high surface hardness, excellent transparency, and excellent cracking resistance, and is therefore suitable for use in decorative molding.

Means for Solving the Problems

The present inventor has intensively studied, and as a result has found that the above object can be achieved by providing a film obtained by molding a resin composition containing a methacrylate-based resin and a specific rubber-containing graft copolymer, which has led to the completion of the present invention.

More specifically, the present invention is directed to an acrylic resin film obtained by forming, into a film, a methacrylic resin composition (D) containing the following components (A) to (C):

a methacrylate-based resin (A) obtained by polymerizing 50 to 100 wt % of a methacrylate and 0 to 50 wt % of at least one monomer copolymerizable therewith;

a rubber-containing graft copolymer (B) obtained by polymerizing the following monomer components (B-1), (B-2), (B-3), and (B-4) in this order so that rubber particles that are a polymerization product of the monomer components (B-1) and (B-2) have an average particle size of 0.2 to 0.4 μm:

a monomer component (B-1) comprising 60 to 100 wt % of a methacrylate (b-1-1), 40 to 0 wt % of a monofunctional monomer (b-1-2) copolymerizable therewith, and 0.05 to 10 parts by weight of a polyfunctional monomer (b-1-3) (with respect to 100 parts by weight of (b-1-1)+(b-1-2));

a monomer component (B-2) comprising 50 to 100 wt % of an acrylate (b-2-1), 50 to 0 wt; of a monofunctional monomer (b-2-2) copolymerizable therewith, and 0.05 to 10 parts by weight of a polyfunctional monomer (b-2-3) (with respect to 100 parts by weight of (b-2-1)+(b-2-2));

a monomer component (B-3) comprising 50 to 100 wt % of a methacrylate (b-3-1) and 50 to 0 wt % of a monofunctional monomer (b-3-2) copolymerizable therewith; and a monomer component (B-4) comprising 0 to 70 wt % of a methacrylate (b-4-1) and 100 to 30 wt % of a monofunctional monomer (b-4-2) copolymerizable therewith; and a rubber-containing graft copolymer (C) that is a two-layer polymer obtained by polymerizing the following monomer components (C-1) and (C-2) in this order so that rubber particles that are a polymerization product of the monomer component (C-1) have an average particle size of 0.02 to 0.15 μm:

a monomer component (C-1) comprising 50 to 100 wt % of an acrylate (c-1-1), 50 to 0 wt % of a methacrylate (c-1-2), and 0.05 to 10 parts by weight of a polyfunctional monomer (c-1-3) (with respect to 100 parts by weight of (c-1-1)+(c-1-2)); and a monomer component (C-2) comprising 50 to 100 wt % of a methacrylate (c-2-1) and 50 to 0 wt % of a monofunctional monomer (c-2-2) copolymerizable therewith.

In the acrylic resin film according to the present invention, the methacrylic resin composition (D) preferably contains 1 to 20 parts by weight of the rubber particles that are a polymerization product of the monomer components (B-1) and (B-2) and 1 to 50 parts by weight of the rubber particles that are a polymerization product of the monomer component (C-1) per 100 parts by weight of the methacrylic resin composition (D).

In the acrylic resin film according to the present invention, the monomer component (C-1) preferably satisfies the following formula (1):

$$20d \leq w \leq 125d \quad (1)$$

wherein d is an average particle size (μm) of the rubber particles that are a polymerization product of the monomer component (C-1) and w is the number of parts by weight of the polyfunctional monomer (c-1-3) (with respect to 100 parts by weight of (c-1-1)+(c-1-2)).

The acrylic resin film according to the present invention preferably has a film thickness of 30 to 500 μm.

The acrylic resin film according to the present invention preferably has a coating layer on its at least one surface.

The acrylic resin film according to the present invention preferably has a hard coat layer on its one surface and has a primer layer on its surface opposite to the one surface.

In this case, the hard coat layer is preferably formed by curing at least one selected from the group consisting of a urethane acrylate-based resin, an acrylate-based resin, and a silicone-based resin.

Further, the hard coat layer preferably has a surface hardness of HB or more.

The present invention may be directed to a molded article made of the above-described acrylic resin film.

The present invention is also directed to a laminate obtained by laminating the acrylic resin film according to the present invention on a base material.

Effects of the Invention

The acrylic resin film according to the present invention has excellent resistance to whitening on bending, high surface hardness, excellent cracking resistance, and excellent transparency.

PREFERRED MODE FOR CARRYING OUT THE INVENTION

A rubber-containing graft copolymer (B) used in the present invention is obtained by first polymerizing a monomer component (B-1) to obtain an innermost-layer polymer. The monomer component (B-1) used in the present invention includes 60 to 100 wt % of a methacrylate (b-1-1), 40 to 0 wt % of a monofunctional monomer (b-1-2) copolymerizable therewith, and 0.05 to 10 parts by weight of a polyfunctional monomer (b-1-3) (with respect to 100 parts by weight of (b-1-1)+(b-1-2)). The polymerization of the monomer component (B-1) may be performed by using a mixture of all the monomers or may be performed in two or more stages by changing the composition of the monomers.

The methacrylate (b-1-1) used here is preferably an alkyl methacrylate. From the viewpoint of polymerizability and cost, the alkyl methacrylate is preferably one having a linear or branched alkyl group containing 1 to 12 carbon atoms. Specific examples of the methacrylate include methyl methacrylate, ethyl methacrylate, propyl methacrylate, butyl methacrylate, 2-ethylhexyl methacrylate, octyl methacrylate, methacrylamide, β-hydroxyethyl methacrylate, dimethylaminoethyl methacrylate, and glycidyl methacrylate. These monomers may be used in combination of two or more of them. The ratio of the weight of the methacrylate (b-1-1) to the total weight of (b-1-1) and (b-1-2) is preferably 60 to 100 wt %, more preferably 70 to 100 wt %, most preferably 80 to 100 wt %. If the weight ratio of the methacrylate (b-1-1) is less than 60 wt %, a resulting film is poor in surface hardness and transparency, which is undesirable.

Further, if necessary, the methacrylate (b-1-1) may be copolymerized with the monofunctional monomer (b-1-2) copolymerizable therewith. As an ethylene-based unsaturated monomer copolymerizable with the methacrylate (b-1-1), an acrylate can be mentioned as an example. The acrylate is preferably an alkyl acrylate. From the viewpoint of polymerization reactivity and cost, the alkyl acrylate is preferably one having a linear or branched alkyl group containing 1 to 12 carbon atoms. Specific examples of the acrylate include methyl acrylate, ethyl acrylate, propyl acrylate, n-butyl acrylate, isobutyl acrylate, t-butyl acrylate, 2-ethylhexyl acrylate, n-octyl acrylate, β-hydroxyethyl acrylate, dimethylaminoethyl acrylate, glycidyl acrylate, acrylamide, and N-methylol acrylamide. Other examples of the ethylene-based unsaturated monomer include: vinyl halides such as vinyl chloride and vinyl bromide; vinyl cyanides such as acrylonitrile and methacrylonitrile; vinyl esters such as vinyl formate, vinyl acetate, and vinyl propionate; aromatic vinyl derivatives such as styrene, vinyl toluene, and α-methylstyrene; vinylidene halides such as vinylidene chloride and vinylidene fluoride; acrylic acid and salts thereof such as acrylic acid, sodium acrylate, and calcium acrylate; and methacrylic acid and salts thereof such as methacrylic acid, sodium methacrylate, and calcium methacrylate. These monomers may be used in combination of two or more of them.

The rubber-containing graft copolymer (B) to be obtained is a cross-linked polymer because the polyfunctional monomer (b-1-3) having two or more non-conjugated reactive double bonds per molecule is copolymerized. Examples of the polyfunctional monomer (b-1-3) used here include allyl methacrylate, allyl acrylate, triallyl cyanurate, triallyl isocyanurate, diallyl phthalate, diallyl maleate, divinyl adipate, divinyl benzene ethylene glycol dimethacrylate, divinyl benzene ethylene glycol diacrylate, diethylene glycol dimethacrylate, diethylene glycol diacrylate, triethylene glycol dimethacrylate, triethylene glycol diacrylate, trimethylol propane trimethacrylate, trimethylol propane triacrylate, tetramethylol methane tetramethacrylate, tetramethylol methane tetraacrylate, dipropylene glycol dimethacrylate, and dipropylene glycol diacrylate. These monomers may be used in combination of two or more of them.

The amount of the polyfunctional monomer (b-1-3) contained in the monomer component (B-1) is preferably 0.05 to 10 parts by weight, more preferably 0.1 to 10 parts by weight with respect to 100 parts by weight of (b-1-1)+(b-1-2). If the polyfunctional monomer content is less than 0.05 parts by weight, there is a tendency that a cross-linked polymer cannot be formed. If the polyfunctional monomer content exceeds 10 parts by weight, a resulting film tends to have low cracking resistance.

Then, a monomer component (B-2) is polymerized in the presence of the innermost-layer polymer (which is a polymerization product of (B-1)) to obtain rubber particles. The monomer component (B-2) used in the present invention includes 50 to 100 wt % of an acrylate (b-2-1), 50 to 0 wt % of a monofunctional monomer (b-2-2) copolymerizable therewith, and 0.05 to 10 parts by weight of a polyfunctional monomer (b-2-3) (with respect to 100 parts by weight of (b-2-1)+(b-2-2)). The polymerization of the monomer component (B-2) may be performed by using a mixture of all the monomers or may be performed in two or more stages by changing the composition of the monomers.

The acrylate (b-2-1) used here is preferably an alkyl acrylate. From the viewpoint of polymerization reactivity and cost, the alkyl acrylate is preferably one having a linear or branched alkyl group containing 1 to 12 carbon atoms. Specific examples of the acrylate include methyl acrylate, ethyl acrylate, propyl acrylate, n-butyl acrylate, isobutyl acrylate, t-butyl acrylate, 2-ethylhexyl acrylate, n-octyl acrylate, β-hydroxyethyl acrylate, dimethylaminoethyl acrylate, glycidyl acrylate, acrylamide, and N-methylolacrylamide. These monomers may be used singly or in combination of two or more of them. The ratio of the weight of the acrylate (b-2-1) to the total weight of (b-2-1) and (b-2-2) is preferably 50 to 100 wt %, more preferably 60 to 100 wt %, most preferably 70 to 100 wt %. If the weight ratio of the acrylate is less than 50 wt %, a resulting film has poor cracking resistance, which is undesirable.

Further, if necessary, the acrylate (b-2-1) may be copolymerized with the monofunctional monomer (b-2-2) copolymerizable therewith. As an ethylene-based unsaturated monomer copolymerizable with the acrylate (b-2-1), a methacrylate can be mentioned as an example. The methacrylate is preferably an alkyl methacrylate. From the viewpoint of polymerizability and cost, the alkyl methacrylate is preferably one having a linear or branched alkyl group containing 1 to 12 carbon atoms. Specific examples of the methacrylate include methyl methacrylate, ethyl methacrylate, propyl methacrylate, butyl methacrylate, 2-ethylhexyl methacrylate, octyl acrylate, methacrylamide, β-hydroxyethyl methacrylate, dimethylaminoethyl methacrylate, and glycidyl methacrylate. Other examples of the ethylene-based unsaturated monomer include vinyl halides such as vinyl chloride and vinyl bromide; vinyl cyanides such as acrylonitrile and methacrylonitrile; vinyl esters such as vinyl formate, vinyl acetate, and vinyl propionate; aromatic vinyl derivatives such as styrene, vinyl toluene, and α-methylstyrene; vinylidene halides such as vinylidene chloride and vinylidene fluoride; acrylic acid and salts thereof such as acrylic acid, sodium acrylate, and calcium acrylate; and methacrylic acid and salts thereof such as methacrylic acid, sodium methacrylate, and calcium methacrylate. These monomers may be used in combination of two or more of them.

The rubber-containing graft copolymer (B) to be obtained is a cross-linked polymer because the polyfunctional monomer (b-2-3) having two or more non-conjugated reactive double bonds per molecule is copolymerized. Examples of the polyfunctional monomer (b-2-3) used here include allyl methacrylate, allyl acrylate, triallyl cyanurate, triallyl isocyanurate, diallyl phthalate, diallyl maleate, divinyl adipate, divinyl benzene ethylene glycol dimethacrylate, divinyl benzene ethylene glycol diacrylate, diethylene glycol dimethacrylate, diethylene glycol diacrylate, triethylene glycol dimethacrylate, triethylene glycol diacrylate, trimethylol propane trimethacrylate, trimethylol propane triacrylate, tetramethylol methane tetramethacrylate, tetramethylol methane tetraacrylate, dipropylene glycol dimethacrylate, and dipropylene glycol diacrylate. These monomers may be used in combination of two or more of them.

The amount of the polyfunctional monomer (b-2-3) contained in the monomer component (B-2) is preferably 0.05 to 10 parts by weight, more preferably 0.1 to 10 parts by weight with respect to 100 parts by weight of (b-2-1)+(b-2-2). If the polyfunctional monomer content is less than 0.05 parts by weight, there is a tendency that a cross-linked polymer cannot be formed. If the polyfunctional monomer content exceeds 10 parts by weight, a resulting film tends to have low cracking resistance.

Then, a monomer component (B-3) is polymerized in the presence of the rubber particles (which are a polymerization product of (B-1) (B-2)) to obtain a graft copolymer. The monomer component (B-3) used in the present invention includes 50 to 100 wt % of a methacrylate (b-3-1) and 50 to 0 wt % of a monofunctional monomer (b-3-2) copolymerizable therewith. The polymerization of the monomer component (B-3) may be performed by using a mixture of all the monomers or may be performed in two or more stages by changing the composition of the monomers.

As the methacrylate (b-3-1) used here is preferably an alkyl methacrylate. From the viewpoint of polymerizability and cost, the alkyl methacrylate is preferably one having a linear or branched alkyl group containing 1 to 12 carbon atoms. Specific examples of the methacrylate include methyl methacrylate, ethyl methacrylate, propyl methacrylate, butyl methacrylate, 2-ethylhexyl methacrylate, octyl acrylate, methacrylamide, β-hydroxyethyl methacrylate, dimethylaminoethyl methacrylate, and glycidyl methacrylate. These monomers may be used in combination of two or more of them. The ratio of the weight of the methacrylate (b-3-1) to the total weight of (b-3-1) and (b-3-2) is preferably 50 to 100 wt %, more preferably 70 to 100 wt %, most preferably 80 to 100 wt %. If the weight ratio of the methacrylate (b-3-1) is less than 50 wt %, a resulting film is poor in surface hardness and transparency, which is undesirable.

Further, if necessary, the methacrylate (b-3-1) may be copolymerized with the monofunctional monomer (b-3-2) copolymerizable therewith. As an ethylene-based unsaturated monomer copolymerizable with the methacrylate (b-3-1), an acrylate can be mentioned as an example. The acrylate is preferably an alkyl acrylate. From the viewpoint of polymerization reactivity and cost, the alkyl acrylate is preferably one having a linear or branched alkyl group containing 1 to 12 carbon atoms. Specific examples of the acrylate include methyl acrylate, ethyl acrylate, propyl acrylate, n-butyl acrylate, isobutyl acrylate, t-butyl acrylate, 2-ethylhexyl acrylate, n-octyl acrylate, β-hydroxyethyl acrylate, dimethylaminoethyl acrylate, glycidyl acrylate, acrylamide, and N-methylol acrylamide. Other examples of the ethylene-based unsaturated monomer include: vinyl halides such as vinyl chloride and vinyl bromide; vinyl cyanides such as acrylonitrile and methacrylonitrile; vinyl esters such as vinyl formate, vinyl acetate, and vinyl propionate; aromatic vinyl derivatives such as styrene, vinyl toluene, and α-methylstyrene; vinylidene halides such as vinylidene chloride and vinylidene fluoride; acrylic acid and salts thereof such as acrylic acid, sodium acrylate, and calcium acrylate; and methacrylic acid and salts thereof such as methacrylic acid, sodium methacrylate, and calcium methacrylate. These monomers may be used in combination of two or more of them.

It is to be noted that the monomer component (B-3) contains no polyfunctional monomer.

Then, a monomer component (B-4) is polymerized in the presence of the graft copolymer (which is a polymerization product of (B-1)+(B-2)+(B-3)) to obtain a rubber-containing graft copolymer (B). The monomer component (B-4) used in the present invention includes 0 to 70 wt % of a methacrylate (b-4-1) and 100 to 30 wt % of a monofunctional monomer (b-4-2) copolymerizable therewith. It is to be noted that the composition of the monomer component (B-4) is different from that of the above-described monomer component (B-3). The polymerization of the monomer component (B-4) may be performed by using a mixture of all the monomers or may be performed in two or more stages by changing the composition of the monomers.

As the methacrylate (b-4-1) used here is preferably an alkyl methacrylate. From the viewpoint of polymerizability and cost, the alkyl methacrylate is preferably one having a linear or branched alkyl group containing 1 to 12 carbon atoms. Specific examples of the methacrylate include methyl methacrylate, ethyl methacrylate, propyl methacrylate, butyl methacrylate, 2-ethylhexyl methacrylate, octyl acrylate, methacrylamide, β-hydroxyethyl methacrylate, dimethylaminoethyl methacrylate, and glycidyl methacrylate. These monomers may be used in combination of two or more of them. The ratio of the weight of the methacrylate (b-4-1) to the total weight of (b-4-1) and (b-4-2) is preferably 0 to 70 wt %, more preferably 20 to 70 wt %, most preferably 30 to 70 wt %. If the weight ratio of the methacrylate (b-4-1) exceeds 70 wt %, a latex powder obtained by powderization performed after polymerization is very fine and has poor dispersibility during molding and therefore a resulting film has poor transparency, which is undesirable.

Further, if necessary, the methacrylate (b-4-1) may be copolymerized with the monofunctional monomer (b-4-2) copolymerizable therewith. As an ethylene-based unsaturated monomer copolymerizable with the methacrylate (b-4-1), an acrylate can be mentioned as an example. The acrylate is preferably an alkyl acrylate. From the viewpoint of polymerization reactivity and cost, the alkyl acrylate is preferably one having a linear or branched alkyl group containing 1 to 12 carbon atoms. Specific examples of the acrylate include methyl acrylate, ethyl acrylate, propyl acrylate, n-butyl acrylate, isobutyl acrylate, t-butyl acrylate, 2-ethylhexyl acrylate, n-octyl acrylate, β-hydroxyethyl acrylate, dimethylaminoethyl acrylate, glycidyl acrylate, acrylamide, and N-methylol acrylamide. Other examples of the ethylene-based unsaturated monomer include: vinyl halides such as vinyl chloride and vinyl bromide; vinyl cyanides such as acrylonitrile and methacrylonitrile; vinyl esters such as vinyl formate, vinyl acetate, and vinyl propionate; aromatic vinyl derivatives such as styrene, vinyl toluene, and α-methylstyrene; vinylidene halides such as vinylidene chloride and vinylidene fluoride; acrylic acid and salts thereof such as acrylic acid, sodium acrylate, and calcium acrylate; and methacrylic acid and salts thereof such as methacrylic acid, sodium methacrylate, and calcium methacrylate. These monomers may be used in combination of two or more of them.

It is to be noted that the monomer component (B-4) contains no polyfunctional monomer.

The weight ratio of the monomer component (B-1) is preferably 5 to 40 wt %, more preferably 10 to 30 wt % per 100 wt % of the total weight of the monomer components (B-1) to (B-4) ((B-1)+(B-2)+(B-3)+(B-4)). If the weight ratio of the monomer component (B-1) exceeds 40 wt %, there is a case where a resulting film has low cracking resistance. The weight ratio of the monomer component (B-2) is preferably 20 to 70 wt %, more preferably 30 to 60% per 100 wt % of the total weight of the monomer components (B-1) to (B-4). If the weight ratio of the monomer component (B-2) exceeds 70 wt %, there is a case where a resulting film has low surface hardness. The weight ratio of the monomer component (B-3) is preferably 5 to 40 wt %, more preferably 10 to 30 wt % per 100 wt % of the total weight of the monomer components (B-1) to (B-4). If the weight ratio of the monomer component (B-3) exceeds 40 wt %, there is a case where a resulting film has low cracking resistance. The weight ratio of the monomer component (B-4) is preferably 1 to 40 wt %, more preferably 5 to 30 wt % per 100 wt % of the total weight of the monomer components (B-1) to (B-4). If the weight ratio of the monomer component (B-4) exceeds 40 wt %, there is a case where a resulting film has low surface hardness.

A rubber-containing graft copolymer (C) used in the present invention is obtained by first polymerizing a monomer component (C-1) to obtain rubber particles. The monomer component (C-1) used in the present invention includes 50 to 100 wt % of an acrylate (c-1-1), 50 to 0 wt % of a methacrylate (c-1-2), and 0.05 to 10 parts by weight of a polyfunctional monomer (c-1-3) (with respect to 100 parts by weight of (c-1-1)+(c-1-2)). The polymerization of the monomer component (C-1) may be performed by using a mixture of all the monomers or may be performed in two or more stages by changing the composition of the monomers. The acrylate (c-1-1) and methacrylate (c-1-2) used here may be the same as those used in the polymerization for producing the rubber-containing graft copolymer (B). The ratio of the weight of the acrylate (c-1-1) to the total weight of (c-1-1) and (c-1-2) is preferably 50 to 100 wt %, more preferably 60 to 100 wt %, most preferably 70 to 100 wt %. If the weight ratio of the acrylate (c-1-1) is less than 50 wt %, a resulting film has poor cracking resistance, which is undesirable.

Then, a monomer component (C-2) is polymerized in the presence of the rubber particles (which are a polymerization product of (C-1)) to obtain a rubber-containing graft copolymer (C). The monomer component (C-2) used in the present invention includes 50 to 100 wt % of a methacrylate (c-2-1) and 50 to 0 wt % of a monofunctional monomer (c-2-2) copolymerizable therewith. The methacrylate (c-2-1) and acrylate (c-2-2) used here may be the same as those used in the polymerization for producing the rubber-containing graft copolymer (B). The ratio of the weight of the acrylate (c-2-1) to the total weight of (c-2-1) and (c-2-2) is preferably 50 to 100 wt %, more preferably 60 to 100 wt %, most preferably 70 to 100 wt %. If the weight ratio of the methacrylate (c-2-1) is less than 50 wt %, a resulting film has poor surface hardness and poor transparency, which is undesirable.

The weight ratio of the monomer component (C-1) contained in the rubber-containing graft copolymer (C) is preferably 10 to 60 wt %, more preferably 20 to 50 wt % per 100 wt % of the total weight of the monomer components (C-1) and (C-2) ((C-1)+(C-2)). If the weight ratio of the monomer component (C-1) is less than 10 wt %, there is a case where a resulting film has low cracking resistance.

A methacrylate-based resin (A) used in the present invention can be obtained by polymerizing 50 to 100 wt % of a methacrylate and 0 to 50 wt % of at least one monomer copolymerizable therewith. The methacrylate and the monofunctional monomer copolymerizable therewith may be the same monomers as those used in the polymerization for producing the rubber-containing graft copolymer (B). The ratio of the weight of the methacrylate to the total weight of the methacrylate-based resin (A) is preferably 50 to 100 wt %, more preferably 60 to 100 wt %, most preferably 70 to 100 wt %. If the weight ratio of the methacrylate is less than 50 wt %, a resulting film has poor surface hardness and poor transparency, which is undesirable.

A method for producing the methacrylate-based resin (A), the rubber-containing graft copolymer (B), and the rubber-containing graft copolymer (C) used in the present invention is not particularly limited, and a known emulsion polymerization method, emulsion-suspension polymerization method, suspension polymerization method, bulk polymerization method, or solution polymerization method is applicable. The rubber-containing graft copolymer (B) and the rubber-containing graft copolymer (C) are particularly preferably produced by an emulsion polymerization method.

From a latex obtained by an emulsion polymerization method, a resin composition is separated and collected by usual operation including solidification, washing, and drying or by treatment such as spray drying or freeze drying.

The average particle size of the rubber particles, which are a polymerization product of the monomer components (B-1) and (B-2), contained in the rubber-containing graft copolymer (B) is preferably 0.2 to 0.4 μm, more preferably 0.2 to 0.3 μm. If the average particle size is less than 0.2 μm, a resulting film has poor cracking resistance, which is undesirable. If the average particle size exceeds 0.4 μm, a resulting film has low resistance to whitening on bending and low transparency, which is undesirable.

The average particle size of the rubber particles, which are a polymerization product of the monomer component (C-1), contained in the rubber-containing graft copolymer (C) is preferably 0.02 to 0.15 μm, more preferably 0.02 to 0.13 μm, even more preferably 0.03 to 0.10 μm. If the average particle size is less than 0.02 μm, a resulting film has poor cracking resistance, which is undesirable. If the average particle size exceeds 0.15 μm, a resulting film has low resistance to whitening on bending and low transparency, which is undesirable.

The relation between the amount of the polyfunctional monomer (c-1-3) of the rubber-containing graft copolymer (C) and the average particle size of the rubber particles that are a polymerization product of the monomer component (C-1) has a large impact on the resistance to whitening on bending of a resulting film. That is, it is important that the average particle size of the rubber particles represented by d (μm) and the number of parts by weight of the polyfunctional monomer (c-1-3) (with respect to 100 parts by weight of (c-1-1)+(c-1-2)) represented by w satisfy the following formula (1):

$$20d \leq w \leq 125d \quad (1).$$

The number of parts by weight of the polyfunctional monomer is preferably within the range represented by the above formula. If the number of parts by weight is outside the above range, a resulting film has poor resistance to whitening on bending, which is undesirable.

A methacrylic resin composition (D) used in the present invention contains the methacrylate-based resin (A), the rubber-containing graft copolymer (B), and the rubber-containing graft copolymer (C). That is, the methacrylic resin composition (D) is characterized by containing two kinds of rubber-containing graft copolymers. The rubber-containing graft copolymer (B) having a rubber particle size of 0.2 to 0.4 μm makes it possible for a resulting film to have cracking resistance, and the rubber-containing graft copolymer (C) having a rubber particle size of 0.02 to 0.15 μm makes it possible for the film to have resistance to whitening on bending. The methacrylic resin composition (D) preferably contains the rubber particles, which are contained in the rubber-containing graft copolymer (B), in an amount of 1 to 20 parts by weight, more preferably 1 to 15 parts by weight per 100 parts by weight of the methacrylic resin composition (D). If the rubber particle content is less than 1 part by weight, a resulting film has poor cracking resistance. If the rubber particle content exceeds 20 parts by weight, a resulting film is poor in surface hardness, transparency, and resistance to whitening on bending. The methacrylic resin composition (D) preferably contains the rubber particles, which are contained in the rubber-containing graft copolymer (C), in an amount of 1 to 50 parts by weight, more preferably 1 to 35 parts by weight per 100 parts by weight of the methacrylic resin composition (D). If the rubber particle content is less than 1 part by weight, a resulting film has poor cracking resistance. If the rubber particle content exceeds 50 parts by weight, a resulting film is poor in surface hardness and transparency.

The methacrylic resin composition (D) used in the present invention is particularly useful as a film. For example, the methacrylic resin composition (D) is successfully processed into a film by a commonly-used melt extrusion method such as an inflation method or a T-die extrusion method, a calender method, a solution casting method, or the like. If necessary, the methacrylic resin composition (D) may be molded into a film while the both surfaces of the film are brought into contact with (inserted between) rolls or metallic belts at the same time, especially with rolls or metallic belts heated to a temperature equal to or higher than the glass transition temperature of the composition so that the obtained film can have better surface properties. Further, depending on the intended use, the film may be subjected to lamination molding or may be modified by biaxial stretching.

Further, if necessary, the methacrylic resin composition (D) used in the present invention may be blended with polyglutarimide, anhydrous glutaric acid polymer, lactone-cyclized methacrylic resin, methacrylic resin, polyethylene terephthalate resin, polybutylene terephthalate resin, or the like. A blending method is not particularly limited, and may be a known method.

An inorganic pigment or an organic dye for coloring, an antioxidant, a heat stabilizer, an ultraviolet absorber, an ultraviolet stabilizer, or the like for further improving stability to heat or light, an antimicrobial agent, a deodorant, a lubricant, or the like may be added to the methacrylic resin composition (D) used in the present invention singly or in combination of two or more of them.

The thickness of an acrylic resin film according to the present invention is preferably 30 to 500 μm, more preferably 30 to 400 μm. If the thickness of the film is less than 30 μm, the processability of the film tends to be low. If the thickness of the film exceeds 500 μm, the moldability of the film tends to be low.

Further, if necessary, the surface gloss of the acrylic resin film according to the present invention may be reduced by a known method. For example, this can be achieved by, for example, kneading an inorganic filler or cross-linked polymer particles with the methacrylic resin composition (D). Alternatively, the obtained film may be embossed to reduce its surface gloss.

The acrylic resin film according to the present invention may be used as a base material on at least one of surfaces of which a coating layer is provided. The type or structure of the coating layer is not particularly limited, and may be arbitrarily selected depending on function required (e.g., improved surface hardness, scratch resistance, self-restoring property, antiglare function, antireflection function, antifingerprint function). However, a coating layer containing at least one selected from the group consisting of a urethane acrylate-based resin, an acrylate-based resin, and a silicone-based resin is preferably provided. This allows the acrylic resin film according to the present invention to have further improved surface hardness while the acrylic resin film maintains its cracking resistance and resistance to whitening on bending.

Examples of a coating agent that can be used for forming the coating layer include UNIDIC V-6840, UNIDIC V-6841, UNIDIC WHV-649, UNIDIC EKS-675, UNIDIC EKC-1054, UNIDIC-124, UNIDIC EKC-821, UNIDIC RC29-120, UNIDIC EKC-578 (manufactured by DIC Corporation), BEAMSET 1200, BEAMSET 371, BEAMSET 710, BEAMSET 575 (manufactured by ARAKAWA CHEMICAL INDUSTRIES, LTD.), LUCIFRAL G-720, LUCIFRAL G-2000, LUCIFRAL NAG1000, LUCIFRAL NAG-3000, LUCIFRAL NEH-1000, LUCIFRAL NEH-2000 (manufactured by Nippon Paint Co., Ltd.), AICAAITRON Z606-25, AICAAITRON Z606-76, AICAAITRON Z606-77, AICAAITRON Z606-78, AICAAITRON Z880-4, and AICAAITRON Z-883 (manufactured by Aica Kogyo Company, Limited).

The coating layer can be formed by any known method, but is preferably formed by a printing method or a coating method. In this case, a coating liquid (solution or dispersion liquid) for forming the coating layer is prepared, and the coating liquid is applied onto at least one of the surfaces of the acrylic resin film, dried by heating for removing a solvent, and if necessary cured by irradiation with electron beams, ultraviolet rays, γ rays, or the like so that a hard coating (hard coat layer) can be formed. This method is preferred in that excellent adhesion between the coating layer and the acrylic resin film can be achieved. The conditions of the irradiation are set depending on the photocurability of the coating layer, but an irradiation dose is usually about 300 to 10,000 mJ/cm$^2$.

Examples of the printing method include known printing methods such as gravure printing, screen printing, and offset printing.

Examples of the coating method include known coating methods such as flow coating, spray coating, bar coating, gravure coating, gravure reverse coating, kiss-reverse coating, microgravure coating, roll coating, blade coating, rod coating, roll doctor coating, air knife coating, comma roll coating, reverse roll coating, transfer roll coating, kiss-roll coating, curtain coating, and dipping coating.

The solvent is preferably a volatile solvent that can dissolve or uniformly disperse an acrylate-based resin and/or a urethane acrylate-based resin and/or a silicone-based resin, has no significant adverse effect on the physical properties (e.g., mechanical strength, transparency) of the acrylic resin film from a practical point of view, and has a boiling point that is not 80° C. or more higher, preferably not 30° C. or more higher than the glass transition temperature of the acrylic resin film.

Examples of such a solvent include various known solvents such as alcohol-based solvents such as methanol, ethanol, isopropyl alcohol, n-butanol, and ethylene glycol; aromatic solvents such as xylene, toluene, and benzene; aliphatic hydrocarbon-based solvents such as hexane and pentane; halogenated hydrocarbon-based solvents such as chloroform and carbon tetrachloride; phenol-based solvents such as phenol and cresol; ketone-based solvents such as methyl ethyl ketone, methyl isobutyl ketone, acetone, and cyclohexanone; ether-based solvents such as diethyl ether, methoxytoluene, 1,2-dimethoxyethane, 1,2-dibutoxyethane, 1,1-dimethoxymethane, 1,1-dimethoxyethane, 1,4-dioxane, and tetrahydrofuran (THF); fatty acid-based solvents such as formic acid, acetic acid, and propionic acid; acid anhydride-based solvents such as acetic anhydride; ester-based solvents such as ethyl acetate, n-propyl acetate, butyl acetate, and butyl formate; nitrogen-containing solvents such as ethylamine, toluidine, dimethylformamide, and dimethylacetamide; sulfur-containing solvents such as thiophene and dimethylsulfoxide; solvents having two or more functional groups such as diacetone alcohol, 2-methoxyethanol (methyl cellosolve), 2-ethoxyethanol (ethyl cellosolve), 2-butoxyethanol (butyl cellosolve), diethylene glycol, 2-aminoethanol, acetone cyanohydrin, diethanolamine, morpholine, 1-acetoxy-2-ethoxyethane, and 2-acetoxy-1-methoxypropane; and water. These solvents may be used singly or in combination of two or more of them.

Among them, a solvent mainly containing ethyl acetate, n-propyl acetate, isopropyl alcohol, methyl ethyl ketone, or methyl isobutyl ketone is preferred because a reduction in the physical properties of the acrylic resin film caused by the solvent can be suppressed. Further, from the viewpoint of adhesion between the coating layer and the acrylic resin film, butyl acetate and methyl isobutyl ketone are preferably used in combination. Further, also from the viewpoint of uneven luster after coating, a medium-boiling solvent such as butyl acetate or methyl isobutyl ketone and a high-boiling solvent such as 2-acetoxy-1-methoxypropane or cyclohexanone are preferably used in combination.

The coating liquid is preferably filtered to remove foreign matter from the viewpoint of reducing the occurrence of uncoated spots or doctor streaks. The filtration may be performed after the preparation of the coating liquid or may be performed just before coating or during coating. The filtration can be performed using a known filtration device, but for example, CPII-10, 03, 01 (trade name) manufactured by CHISSO FILTER CO., LTD. is preferably used.

The thickness of the coating layer is preferably 1 to 20 μm, more preferably 1 to 10 μm, most preferably 3 to 7 μm. If the thickness exceeds 20 μm, the film is likely to be cracked, and if the thickness is less than 1 μm, the film has low surface hardness.

The acrylic resin film according to the present invention may have a primer layer on its surface opposite to the surface on which the hard coat layer is provided. As a composition for forming the primer layer, a resin is used which is excellent in adhesion with a material to be used in a processing process performed later, such as an ink for printing or a metal for use in metal vapor deposition. Examples of such a resin include urethane-based resins, acrylic resins, polyester-based resins, polycarbonates, epoxy-based resins, and melamine-based resins.

The thickness of the primer layer is preferably 0.5 to 10 μm, more preferably 0.5 to 5 μm, most preferably 0.5 to 3 μm. If the thickness is less than 0.5 μm, the primer layer poorly contributes to adhesion, and if the thickness exceeds 10 μm, cracking occurs during vacuum molding.

The acrylic resin film according to the present invention may be used by laminating it on a base material such as a metal or plastic. Examples of a method for laminating the film include lamination molding, wet lamination in which an adhesive is applied onto a metal plate, such as a steel plate, and then the film is placed on and bonded to the metal plate by drying, dry lamination, extrusion lamination, and hot melt lamination. Examples of a method for laminating the film on a plastic part include insert molding or laminate injection press molding in which the film is placed in a mold and then a resin is injected into the mold, and in-mold molding in which the preliminarily-molded film is placed in a mold and then a resin is injected into the mold.

A film-laminated article obtained by laminating the acrylic resin film according to the present invention on a base material can be used for alternatives to painting such as interior or exterior materials for automobiles, building materials such as window frames, bathroom fitments, wallpapers, and floor materials, daily goods, housings for furniture and electric devices, housings for OA equipment such as facsimiles, laptop computers, and copy machines, front panels for liquid crystal displays for use in terminals such as mobile phones, smartphones, and tablets, and components for electric or electronic devices. A molded article made of the acrylic resin film according to the present invention can be used for lighting lenses, car headlights, optical lenses, optical fibers, optical discs, light guide plates for liquid crystal displays, films for liquid crystal displays, medical products requiring sterilization, cooking containers for microwave ovens, housings for home appliances, toys, and recreational goods.

EXAMPLES

Hereinbelow, the present invention will be described in more detail based on examples, but is not limited to these examples.

It is to be noted that in the following production examples, examples, and comparative examples, "part(s)" and "%" represent part(s) by weight and % by weight, respectively.

Abbreviations for substances are as follows.
BA: n-butyl acrylate
MMA: methyl methacrylate
St: styrene
AIMA: allyl methacrylate It is to be noted that in the following examples and comparative examples, measurements of physical properties were performed by the following methods.

Evaluation of Polymerization Conversion Rate

A latex obtained by polymerization was dried at 120° C. for 1 hour in a hot air drier to determine its solid content, and a polymerization conversion rate (%) was calculated by 100×solid content/amount of monomer charged.

Evaluation of Average Particle Size of Rubber Particles

A compound obtained by blending the rubber-containing graft copolymer (B) (or the rubber-containing graft copolymer (C)) and SUMIPEX EX (manufactured by Sumitomo Chemical Company, Limited) in a 50:50 ratio was molded to obtain a film, and the micrograph of the film was taken by a $RuO_4$ staining and ultrathin sectioning method with a transmission electron microscope (JEM-1200EX manufactured by JEOL Ltd.) at an accelerating voltage of 80 kV. Then, 100 images of rubber particles were randomly selected from the obtained micrograph, and the average of their particle sizes was determined.

Evaluation of Haze

The transparency of the obtained film was evaluated by measuring the haze of the film in accordance with JIS K6714 at a temperature of 23° C.±2° C. and a humidity of 50%±5%.

Evaluation of Pencil Hardness

The pencil hardness of the obtained film was measured in accordance with JIS K5600-5-4.

Evaluation of Cracking Resistance

The film was cut with a utility knife and evaluated according to the following criteria:
A: the occurrence of cracking was not observed in cut surfaces;
B: the occurrence of cracking was observed in cut surfaces; and
C: the occurrence of cracking was significantly observed in cut surfaces.

Resistance to Whitening on Bending

The film was bent at 180° at 23° C. and observed to evaluate whether the whitening of the film occurred according to the following criteria:
A: whitening was not observed;
B: whitening was slightly observed; and
C: whitening was significantly observed.

Tensile Elongation at 120° C.

The tensile elongation of the film having a coating layer was measured with a Tensilon tensile tester equipped with a thermostatic chamber at 120° C. under conditions of a distance between chucks of 50 mm and a tension rate of 200 mm/min to determine the elongation at the time when the coating layer could not follow the elongation of the acrylic resin film so that cracking occurred in the coating layer.

Production Example 1

Production of Rubber-Containing Graft Copolymer (B1)

Preparation of Innermost-Layer Polymer

A mixture having the following composition was charged into a glass reactor and heated to 80° C. with stirring in a nitrogen stream, and then 25% of a mixed liquid of a monomer mixture composed of 25 parts of methyl methacrylate and 1 part of allyl methacrylate (shown as (B-1) of Production Example 1 in Table 1) and 0.1 parts of t-butyl hydroperoxide was charged into the reactor at once to perform polymerization for 45 minutes.

| | |
|---|---|
| Deionized water | 220 parts |
| Boric acid | 0.3 parts |
| Sodium carbonate | 0.03 parts |
| Sodium N-lauroyl sarcosinate | 0.09 parts |
| Sodium formaldehyde sulfoxylate | 0.09 parts |
| Disodium ethylenediaminetetraacetate | 0.006 parts |
| Ferrous sulfate | 0.002 parts |

Then, remaining 75% of the mixed liquid was continuously added over 1 hour. After the completion of the addition, the mixture was kept at the same temperature for 2 hours to complete the polymerization. During this time, 0.2 parts of sodium N-lauroyl sarcosinate was added. The polymerization conversion rate (amount of polymer formed/ amount of monomer charged) of the thus obtained innermost-layer cross-linked methacrylic polymer latex was 98%.

Preparation of Rubber Particles

The obtained innermost-layer polymer latex was kept at 80° C. in a nitrogen stream, 0.1 parts of potassium persulfate was added, and then a monomer mixture composed of 41 parts of n-butyl acrylate, 9 parts of styrene, and 1 part of allyl methacrylate (shown as (B-2) of Production Example 1 in Table 1) was continuously added over 5 hours. During this time, 0.1 parts of potassium oleate was added in three parts. After the completion of the addition of the monomer mixed liquid, 0.05 parts of potassium persulfate was further added and the mixture was kept for 2 hours to complete polymerization, obtaining a latex of rubber particles. The polymerization conversion rate of the obtained rubber particles was 99%.

Preparation of Graft Copolymer

The obtained latex of rubber particles was kept at 80° C., 0.02 parts of potassium persulfate was added, and then a monomer mixture composed of 14 parts of methyl methacrylate and 1 part of n-butyl acrylate (shown as (B-3) of Production Example 1 in Table 1) was continuously added over 1 hour. After the completion of the addition of the monomer mixed liquid, the mixture was kept for 1 hour to obtain a graft copolymer latex. The polymerization conversion rate of the graft copolymer latex was 99%.

Preparation of Rubber-Containing Graft Copolymer

The obtained latex of rubber particles was kept at 80° C., and a monomer mixture of 5 parts of methyl methacrylate and 5 parts of n-butyl acrylate (shown as (B-4) of Production Example B1 in Table 1) was continuously added over 0.5 hours. After the completion of the addition of the monomer mixed liquid, the mixture was kept for 1 hour to obtain a rubber-containing graft copolymer latex. The polymerization conversion rate of the rubber-containing graft copolymer latex was 99%.

The obtained rubber-containing graft copolymer latex was subjected to salting-out and coagulation with calcium chloride, heat treatment, and drying to obtain a white powder of a rubber-containing graft copolymer (B1).

Production Examples 2 to 4

Rubber-containing graft copolymers (B2) to (B4) were obtained in the same manner as in Production Example 1 except that the compositions of the monomer components (B-1) to (B-4) were changed as shown in Table 1.

TABLE 1

| Rubber-containing graft copolymer | | | Production Examples | | | |
|---|---|---|---|---|---|---|
| | | | 1 B1 | 2 B2 | 3 B3 | 4 B4 |
| Monomer mixture (part(s)) | (B-1) | MMA | 25 | 10 | 25 | 25 |
| | | BA | 0 | 15 | 0 | 0 |
| | | AlMA | 1 | 1 | 1 | 1 |
| | (B-2) | BA | 41 | 41 | 41 | 41 |
| | | St | 9 | 9 | 9 | 9 |
| | | AlMA | 1 | 1 | 1 | 1 |
| | (B-3) | MMA | 14 | 14 | 14 | 19 |
| | | BA | 1 | 1 | 1 | 6 |

TABLE 1-continued

| Rubber-containing graft copolymer | | | Production Examples | | | |
|---|---|---|---|---|---|---|
| | | | 1 B1 | 2 B2 | 3 B3 | 4 B4 |
| | (B-4) | MMA | 5 | 5 | 5 | — |
| | | BA | 5 | 5 | 5 | — |
| Average particle size of rubber particles (μm) | | | 0.25 | 0.25 | 0.13 | 0.25 |

Production Example 5

Production of Rubber-Containing Graft Copolymer (C1)

The following substances were charged into an 8-liter polymerization apparatus equipped with a stirrer.

| Deionized water | 200 parts |
| Sodium dioctyl sulfosuccinate | 0.25 parts |
| Sodium formaldehyde sulfoxylate | 0.15 parts |
| Disodium ethylenediaminetetraacetate | 0.001 parts |
| Ferrous sulfate | 0.00025 parts |

Air was fully purged from the polymerization apparatus with nitrogen gas so that the polymerization apparatus contained substantially no oxygen. Then, the temperature in the polymerization apparatus was set to 60° C., and a mixed liquid of a monomer mixture composed of 27 parts of n-butyl acrylate, 3 parts of methyl methacrylate, and 0.9 parts of allyl methacrylate and 0.2 parts of cumene hydroperoxide was continuously added over 3 hours. After the completion of the addition, polymerization was further continued for 0.5 hours to obtain rubber particles (which were a polymerization product of (C-1)). The polymerization conversion rate of the rubber particles was 99.5%.

Then, 0.05 parts of sodium dioctyl sulfosuccinate was charged, and then the temperature in the polymerization apparatus was set to 60° C., a mixed liquid of a monomer mixture composed of 7 parts of n-butyl acrylate and 63 parts of methyl methacrylate and 0.2 parts of cumene hydroperoxide was continuously added over 5 hours, and polymerization was further continued for 1 hour to obtain a rubber-containing graft copolymer latex. The polymerization conversion rate of the rubber-containing graft copolymer latex was 98.5%. The obtained latex was subjected to salting-out and coagulation with calcium chloride, washing with water, and drying to obtain a white powder of a rubber-containing graft copolymer (C1).

The average particle size of rubber particles of the rubber-containing graft copolymer (C1) was 0.08 μm.

Examples 1 to 7 and Comparative Examples 1 to 5

The obtained powdery rubber-containing graft copolymers (B) and (C) were blended to achieve their respective numbers of parts of rubber particles shown in Table 3, and the rubber-containing graft copolymers (B) and (C) and SUMIPEX EX (which is a methacrylate-based resin containing 95 wt % of methyl methacrylate and 5 wt % of methyl acrylate manufactured by Sumitomo Chemical Company, Limited) were blended so that their total amount was 100 parts with a blending machine (SUPERFLOATER SFC-50 manufactured by KAWATA MFG Co., Ltd.) for 3 minutes and then melt-kneaded using a 40 mmϕ single screw extruder equipped with a vent at a cylinder temperature of 240° C. to obtain pellets. The obtained pellets were molded using a 40 mmϕ extruder equipped with a T die (NEX040397 manufactured by Nakamura Sanki K.K.) at a die temperature of 240° C. to obtain a 100 μm-thick film.

Various properties of the obtained film using the powders were evaluated and the results of the evaluations are shown in Table 2. It is to be noted that the number of parts of rubber particles shown in Table 2 is the number of parts by weight per 100 parts by weight of a whole resin composition.

TABLE 2

|  |  | Examples |  |  |  |  |  |  | Comparative Examples |  |  |  |  |
|---|---|---|---|---|---|---|---|---|---|---|---|---|---|
|  |  | 1 | 2 | 3 | 4 | 5 | 6 | 7 | 1 | 2 | 3 | 4 | 5 |
| Rubber-containing graft copolymer (B) | | B1 | B1 | B1 | B1 | B1 | B1 | B1 | B2 | — | B3 | B4 | B2 |
| Rubber-containing graft copolymer (C) | | C1 | C1 | C1 | C1 | C1 | C1 | C1 | C1 | C1 | C1 | C1 | — |
| Number of parts of rubber particles (parts) | Rubber-containing graft copolymer (B) | 5 | 5 | 10 | 5 | 3.1 | 1.9 | 3.8 | 5 | 0 | 5 | 5 | 10 |
| | Rubber-containing graft copolymer (C) | 15 | 30 | 10 | 5 | 34.5 | 28.5 | 21.2 | 15 | 20 | 10 | 15 | 0 |
| Cracking resistance | | A | A | A | A | A | A | A | A | B | B | A | A |
| Pencil hardness | | H | F | H | 2H | H | H | H | F | F | H | H | H |
| Resistance to whitening on bending | | A | A | A | A | A | A | A | A | A | A | A | C |
| Haze | | 0.6 | 0.7 | 0.7 | 0.5 | 0.5 | 0.5 | 0.5 | 1.3 | 0.5 | 0.5 | 1.5 | 1.8 |

Examples 8 to 13 and Comparative Examples 5 to 8

A urethane acrylate-based resin dispersion liquid containing RC29-124 (manufactured by DIC Corporation) and having a solid content concentration of 30% was applied onto each of the films obtained in Examples 5 to 7 and Comparative Examples 1 to 3 and 5 with a bar coater (#6 or #10). After the completion of the coating operation, the film was dried at 80° C. for 1 min to volatilize a solvent and then irradiated with ultraviolet rays at 748.4 mJ/min to form a coating layer having a thickness of 4 μm or 7 μm. Various properties of the obtained film were evaluated and the results of the evaluations are shown in Table 3.

rubber particles that are a polymerization product of the monomer components (B-1) and (B-2) have an average particle size of 0.2 to 0.4 μm:

a monomer component (B-1) comprising 60 to 100 wt % of a methacrylate (b-1-1), 40 to 0 wt % of a monofunctional monomer (b-1-2) copolymerizable therewith, and 0.05 to 10 parts by weight of a polyfunctional monomer (b-1-3) with respect to 100 parts by weight of (b-1-1)+(b-1-2);

a monomer component (B-2) comprising 50 to 100 wt % of an acrylate (b-2-1), 50 to 0 wt % of a monofunctional monomer (b-2-2) copolymerizable therewith, and 0.05 to 10 parts by weight of a polyfunctional monomer (b-2-3) with respect to 100 parts by weight of (b-2-1)+(b-2-2);

a monomer component (B-3) comprising 80 to 100 wt % of a methacrylate (b-3-1) and 20 to 0 wt % of a monofunctional monomer (b-3-2) copolymerizable therewith, and no polyfunctional monomer, the monofunctional monomer (b-3-2) being an acrylate; and a monomer component (B-4) comprising 20 to 70 wt % of a methacrylate (b-4-1) and 80 to 30 wt % of a mono-

TABLE 3

|  | Examples |  |  |  |  |  | Comparative Examples |  |  |  |
|---|---|---|---|---|---|---|---|---|---|---|
|  | 8 | 9 | 10 | 11 | 12 | 13 | 5 | 6 | 7 | 8 |
| Base film | Example 5 | Example 5 | Example 6 | Example 6 | Example 7 | Example 7 | Comparative Example 1 | Comparative Example 2 | Comparative Example 3 | Comparative Example 5 |
| Film thickness of coating layer (μm) | 4 | 7 | 4 | 7 | 4 | 7 | 4 | 4 | 4 | 4 |
| Cracking resistance | A | B | A | B | A | B | A | C | B | A |
| Pencil hardness | H | H | 2H | 2H | 2H | 2H | F | F | 2H | 2H |
| Resistance to whitening on bending | A | A | A | A | A | A | A | A | A | C |
| Haze | 0.4 | 0.4 | 0.3 | 0.4 | 0.3 | 0.3 | 1.3 | 0.5 | 0.5 | 1.5 |
| Tensile elongation at 120° C. (%) | 30 | 20 | 30 | 20 | 30 | 20 | 30 | 30 | 30 | 30 |

The invention claimed is:
1. An acrylic resin film obtained by forming, into a film, a methacrylic resin composition (D) containing the following components (A) to (C):
 a methacrylate-based resin (A) obtained by polymerizing 50 to 100 wt % of a methacrylate and 0 to 50 wt % of at least one monomer copolymerizable therewith;
 a rubber-containing graft copolymer (B) obtained by polymerizing only the following monomer components (B-1), (B-2), (B-3), and (B-4) in this order so that functional monomer (b-4-2) copolymerizable therewith, the monofunctional monomer (b-4-2) being an acrylate; and a rubber-containing graft copolymer (C) that is a two-layer polymer obtained by polymerizing the following monomer components (C-1) and (C-2) in this order so that rubber particles that are a polymerization product of the monomer component (C-1) have an average particle size of 0.02 to 0.15 μm:

a monomer component (C-1) comprising 50 to 100 wt % of an acrylate (c-1-1), 50 to 0 wt % of a methacrylate (c-1-2), and 0.05 to 10 parts by weight of a polyfunctional monomer (c-1-3) (with respect to 100 parts by weight of (c-1-1)+(c-1-2)); and a monomer component (C-2) comprising 50 to 100 wt % of a methacrylate (c-2-1) and 50 to 0 wt % of a monofunctional monomer (c-2-2) copolymerizable therewith, wherein a weight ratio of the monomer component (B-4) is more than 5% by weight and less than 30% by weight per 100 wt % of a total weight of the monomer components (B-1) to (B-4).

2. The acrylic resin film according to claim 1, wherein the methacrylic resin composition (D) contains 1 to 20 parts by weight of the rubber particles that are a polymerization product of the monomer components (B-1) and (B-2) and 1 to 50 parts by weight of the rubber particles that are a polymerization product of the monomer component (C-1) per 100 parts by weight of the methacrylic resin composition (D).

3. The acrylic resin film according to claim 1, wherein the monomer component (C-1) satisfies the following formula (1):

$$20d \leq w \leq 125d \quad (1)$$

wherein d is an average particle size (μm) of the rubber particles that are a polymerization product of the monomer component (C-1) and w is the number of parts by weight of the polyfunctional monomer (c-1-3) (with respect to 100 parts by weight of (c-1-1)+(c-1-2)).

4. The acrylic resin film according claim 1, which has a film thickness of 30 to 500 μm.

5. The acrylic resin film according to claim 1, which has a coating layer on its at least one surface.

6. The acrylic resin film according to claim 1, which has a hard coat layer on its one surface and has a primer layer on its surface opposite to the one surface.

7. The acrylic resin film according to claim 6, wherein the hard coat layer is formed by curing at least one selected from the group consisting of a urethane acrylate-based resin, an acrylate-based resin, and a silicone-based resin.

8. The acrylic resin film according to claim 6, wherein the hard coat layer has a surface hardness of HB or more.

9. A molded article made of the acrylic resin film according to claim 1.

10. A laminate obtained by laminating the acrylic resin film according to claim 1 on a base material.

11. The acrylic resin film according to claim 1, wherein the monomer component (B-4) comprising 30 to 70 wt % of a methacrylate (b-4-1) and 70 to 30 wt % of a monofunctional monomer (b-4-2) copolymerizable therewith, the monofunctional monomer (b-4-2) being an acrylate.

* * * * *